United States Patent [19]

Tachibana

[11] Patent Number: 4,528,623
[45] Date of Patent: Jul. 9, 1985

[54] CONTROLLER WITH PROGRAMMER FOR SELECTIVELY PROVIDING PROGRAMS TO OPERATE CONTROLLER

[75] Inventor: Kouji Tachibana, Katsuta, Japan

[73] Assignee: Hitachi, Ltd., Tokyo, Japan

[21] Appl. No.: 326,810

[22] Filed: Dec. 2, 1981

[30] Foreign Application Priority Data

Dec. 5, 1980 [JP] Japan .................................. 55-170955

[51] Int. Cl.³ .............................................. G06F 15/46
[52] U.S. Cl. .................................... 364/191; 364/188; 364/189
[58] Field of Search ............... 364/191, 192, 193, 171, 364/146, 147, 188, 189, 190

[56] References Cited

U.S. PATENT DOCUMENTS

| | | | |
|---|---|---|---|
| 3,959,636 | 5/1976 | Johnson et al. | 364/189 |
| 4,163,284 | 7/1979 | Kishi et al. | 364/191 X |
| 4,204,253 | 5/1980 | van den Hanenburg et al. | 364/189 X |
| 4,356,552 | 10/1982 | Imazeki et al. | 364/171 X |
| 4,379,335 | 4/1983 | Kirsch et al. | 364/193 X |
| 4,393,449 | 7/1983 | Takeda et al. | 364/191 X |

*Primary Examiner*—Joseph Ruggiero
*Attorney, Agent, or Firm*—Antonelli, Terry & Wands

[57] ABSTRACT

A controller is provided with a programmer, and has a program memory and an arithmetic processing portion. The programmer has a key board with keys labeled with different computing elements, in instrumentation terms, necessary for determining the functions of the controller, and produces programs for forming control loops of desired functions in response to depression of the keys thereof and stores the programs in the program memory. The arithmetic processing portion is supplied with input data in digital form, and computes the input data in accordance with the program which is stored in the program memory. The program memory is capable of being selectively plugged into either the controller or the programmer.

7 Claims, 14 Drawing Figures

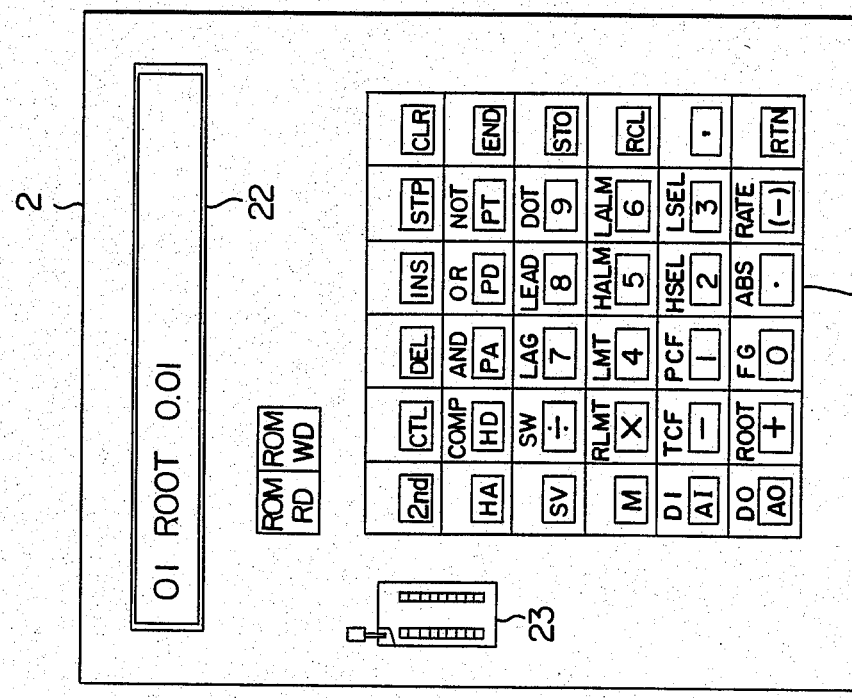
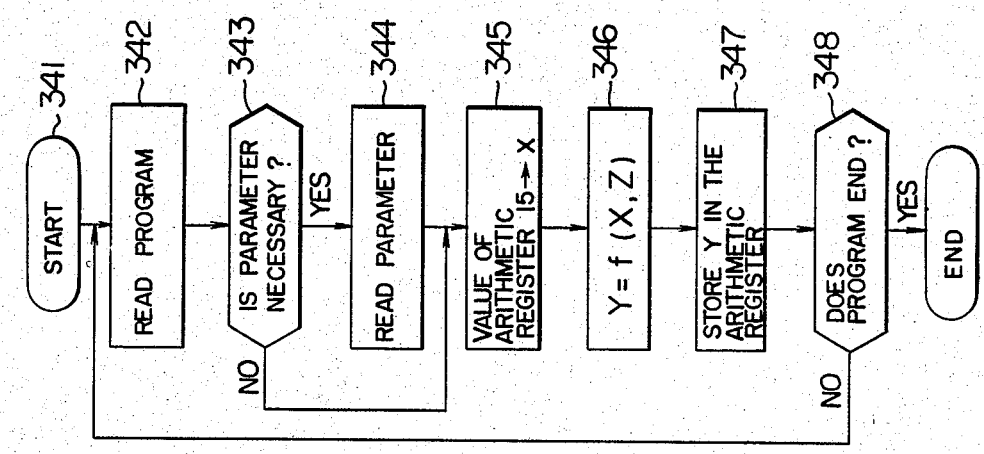
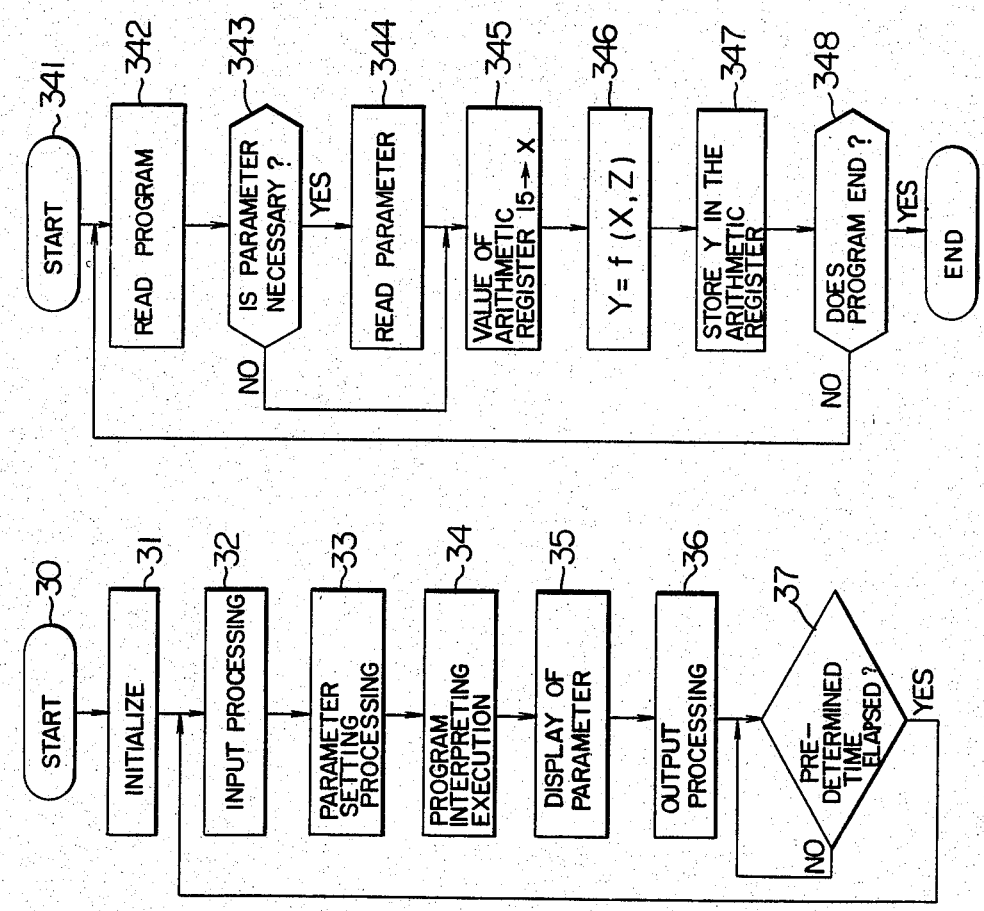

| PROGRAM STEPS | KEY OPERATION | CONTENTS |
|---|---|---|
| 0 1 | RCL  AI  1  RTN | AI—1 → X |
| 0 2 | CTL  1  SV  RTN | STANDARD PID COMPUTING |
| 0 3 | STO  AO  1  RTN | X → AO—1 |
| 0 4 | END | |

FIG. 9
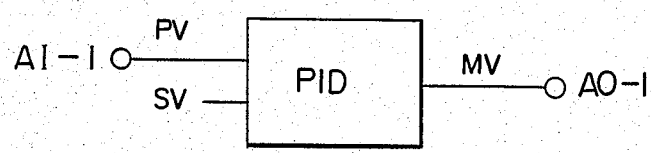
FIG. 11
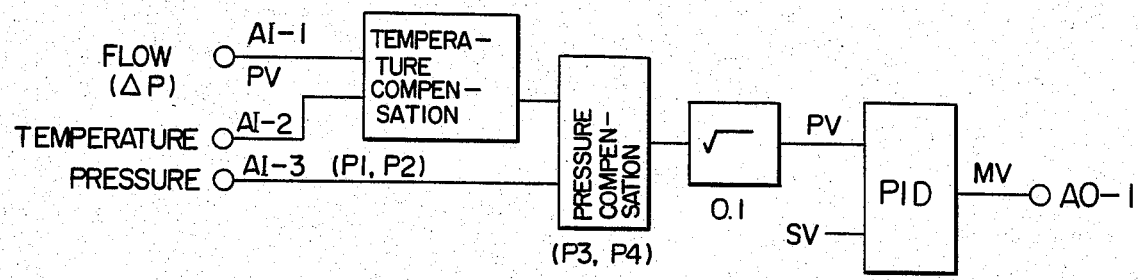
FIG. 12
| PROGRAM STEPS | KEY OPERATION | CONTENTS |
|---|---|---|
| 01 | RCL  AI  1  RTN | AI–1 → X |
| 02 | TCF  AI  2  ,  PA  1  ,  PA  2  RTN | TEMPERATURE COMPENSATION COMPUTATION |
| 03 | PCF  AI  3  ,  PA  3  ,  PA  4  RTN | PRESSURE COMPENSATION COMPUTATION |
| 04 | ROOT  0.1  RTN | SQUARE ROOT COMPUTING (CUT-POINT) |
| 05 | CTL  1  SV  RTN | STANDARD PID COMPUTING |
| 06 | STO  AO  1  RTN | X → AO–1 |
| 07 | END | |

| PROGRAM STEPS | KEY OPERATION | CONTENTS |
|---|---|---|
| 01 | RCL AI 1 RTN | AI−1 → X |
| 02 | LAG PT 6 RTN | FILTER |
| 03 | STO PV RTN | X → PV |
| 04 | HALM PA 4 RTN | UPPER LIMIT ALARM |
| 05 | STO M 1 RTN | X (ALARM RESULT) → M1 |
| 06 | RCL PV RTN | PV → X |
| 07 | LALM PA 5 RTN | LOWER LIMIT ALARM |
| 08 | OR M 1 RTN | UPPER AND LOWER LIMIT |
| 09 | STO DO 1 RTN | X → DO−1 |
| 10 | RCL PV RTN | PV → X |
| 11 | CTL 1 SV RTN | STANDARD |
| 12 | STO AO 1 RTN | X → AO−1 |
| 13 | END | |

CONTROLLER WITH PROGRAMMER FOR SELECTIVELY PROVIDING PROGRAMS TO OPERATE CONTROLLER

BACKGROUND OF THE INVENTION

This invention relates to a controller in which a computer is incorporated, and particularly to a controller to which specific and variable programs can be supplied by an operator.

For example, a controller having a microcomputer incorporated therein is used to execute by the combination of some computing elements in accordance with the function of the controller, a process control such as a PID control loop with upper and lower limit alarm, and a gas flow control loop with temperature and pressure compensation ability. In order to combine computing elements, a computing program is necessary, and the controller is constructed to specify and change a desired computing program by key operation.

In this conventional controller, however, the computing elements include: Control computing elements such as a standard PID control computing element, a nonlinear PID control computing element, and a linear control computing element; and general computing elements such as computing elements of addition, subtraction, multiplication and division, an absolute value computing element and a square root computing element; the total number of which amounts to several tens of different kinds of computing elements. In addition, the computing program necessary for forming a control loop by selecting proper ones from such a large number of computing elements is produced by normally using assembly language or compiler language. Such a program language can easily be employed by those skilled in the software field of computer technology, but is difficult to use for the actual operators of the controller. Therefore, much labor is required for modification and any change of the program in the field of process control.

SUMMARY OF THE INVENTION

It is an object of this invention to provide a controller capable of easy modification and change by operators in the field of process control so as to form a desired control loop.

According to this invention, the controller body is provided with a programmer device capable of specifying and changing a desired program in response to the request of an operator. In addition, the key board of the programmer has keys labeled with letters corresponding to the different computing elements necessary for determining the function of the controller, in instrumentation terms which are understandable with ease by the operator in the field. Thus, the operator in the field can easily produce programs for forming a desired control loop by key operation of the programmer as if he operated an electronic desk-top calculator.

BRIEF DESCRIPTION OF THE DRAWINGS

FIGS. 3 and 4 are flow charts for the operation of the controller.

FIG. 5 shows the front panel of the programmer.

FIG. 9 is an arrangement for PID computing.

FIG. 11 is an arrangement for PID computation with temperature compensation ability.

FIG. 12 shows the procedure of key operation for producing a program for the computation as shown in FIG. 11.

DESCRIPTION OF THE PREFERRED EMBODIMENTS

Figure 1:
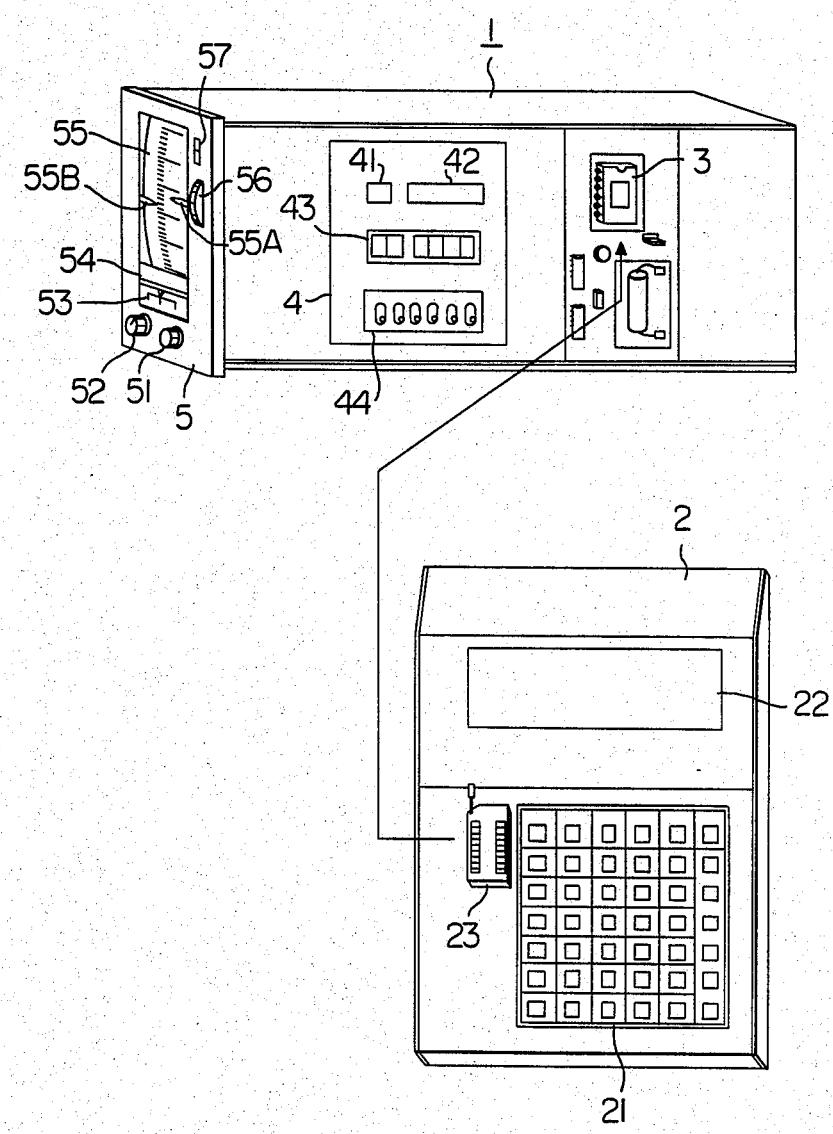
FIG. 1 shows the general appearance of one embodiment of each of a controller and programmer according to this invention.

One embodiment of this invention will next be described with reference to the accompanying drawings in which FIG. 1 shows the general appearance of the controller of one embodiment of the invention. First, referring to FIG. 1, there is shown a controller body 1 including a microcomputer and a detachable program memory (PROM) 3, and which forms a desired control loop for performing process control in accordance with the program in the program memory 3. This controller body 1 also has a parameter setting portion 4 necessary for performing process control and a front panel 5. The parameter setting portion 4 has a parameter number display 41, a data display 42 and key switches 43 for selecting a parameter and data. The parameters in the controller are grouped into three types of parameters: Control parameters C1 to C16 for special use of PID control arithmetic operations, variable parameters P1 to P16 for operations other than a PID control operation, and indication parameters H1 to H16 for indicating interim data during an arithmetic operation. A numerical value at each of these parameters corresponds to data; for example, parameter No. and data are shown as "C01" and "0.500" on the number and data displays 41 and 42. The key switches 43 can be operated to change the parameter and data indication. Also, shown at 44 are a REMOTE/LOCAL selector, a SET/LOCK selector, HOLD/RESET selector, a communication line ON/OFF switch and so on. The REMOTE/LOCAL selector is used to select a constant value setting for determining the value SV by operating a setting dial 56 or external analog input value. The SET/LOCK selector is used to select variable or fixed data of a parameter. When the selector is in the SET position, this allows a change of data parameter by operating the key switches 43. The HOLD/RESET selector, when the power supply of the controller is turned off and again recovers on-condition, selects, in HOLD mode, power output MV just before turning-off of the power supply and in RESET mode, zero power output. The communication line ON/OFF switch is used for selectively connecting the controller and a host computer by a communication line, and in the ON mode it permits the host computer to read and write data on the controller. This parameter setting portion 4 is useful to read and set the parameter of the control loop formed by the computing program in the program memory 3.

The front panel 5 is formed of a control knob 51 for directly increasing or decreasing the output MV on the panel of the controller, an AUTO/MANUAL change-over knob 52 for selecting the operation output of the value resulting from the PID arithmetic operation AUTO or of the value to which the control knob 51 adjusted the output MV (MANUAL), an output indicator 53, an indicator 54 for digital indication of measured values, set values and abnormality of meters, and an indicating portion 55 having a pointer 55A for pointing to a set value and a pointer 55B for pointing to a measured value. The set-value pointer 55A is moved by the setting dial 56. Also, shown at 57 is an indicator for REMOTE/LOCAL and alarm indication.

In the program memory 3 provided in the controller body 1 are stored computing programs which are produced in advance by a programmer 2. Specifically, the program memory 3 is mounted on a socket 23 of the programmer 2, and necessary keys of a key board 21 are operated or depressed while viewing a computing program displayed on a display 22, to write the necessary computing program in the program memory 3.

Figure 2:
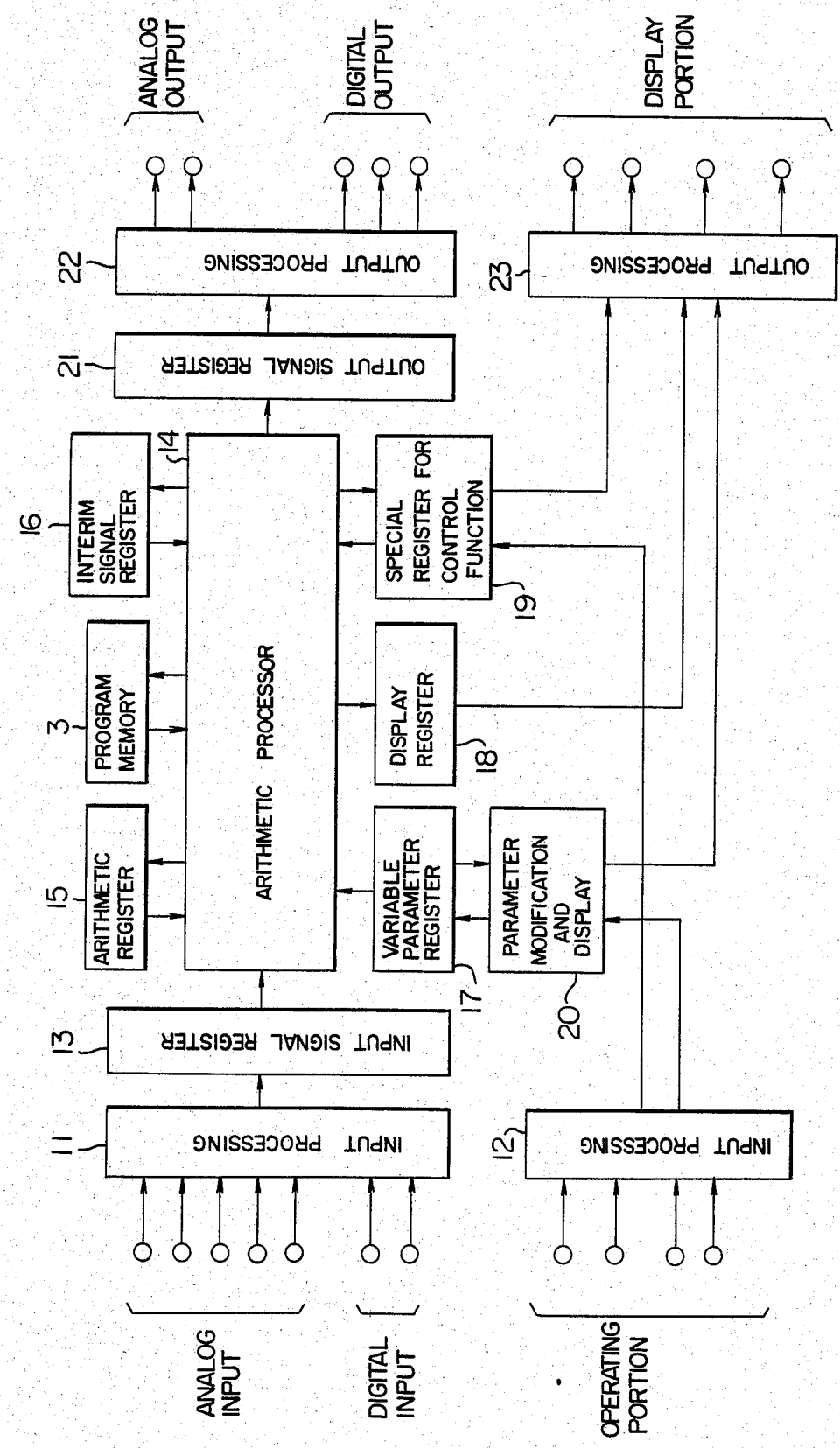
FIG. 2 is a block diagram of the circuit arrangement of the controller.

The process control operation of the controller will be described with reference to FIG. 2. FIG. 2 shows the whole arrangement of the controller. Analog input signals, such as measured values from various transducers, are applied to and processed (such as converted from analog to digital value) by an input processing circuit 11 and are then applied to an input signal register 13. Similarly, digital input signals from the contacts of various switches are applied via the input processing circuit 11 to the input signal register 13. An arithmetic processor 14 is supplied with the input signals from the input signal register 13, and executes one of the computing programs stored in the program memory 3. The results from the processor 14 are applied to an output signal register 21, the output of which is processed (as for example, converted from digital to analog value) by an output processing circuit 22 and then fed to various final control elements as analog output signals. The digital output signal is processed by the output processing circuit 22 and fed therefrom as a contact signal.

Upon execution of a computing program, the processor 14 is supplied with not only the output of the input signal register 13, but variable parameters from a variable parameter register 17, modes (switching information from REMOTE/LOCAL and AUTO/MANUAL positions) and control parameters from a control function special register 19, as well as values from an interim signal register 16 for temporarily storing the results of the arithmetic operations.

An input processing circuit 12 is supplied with setting signals from the operating portions such as the parameter setting portion 4 and the knobs on the front panel 5, and after processing the output is fed to a parameter change/display circuit 20, which supplies the variable parameter to the variable parameter register 17 and the parameter from the register 17 to an output processing circuit 23. The values during the arithmetic operations are applied from the processor 14 via a display register 18 to the output processing circuit 23 where they are processed for output. The output of the output processing circuit 23 is fed to a display.

An arithmetic register 15 stores data for execution of the operation, and supplies the data to the arithmetic processor 14 and the result of the operation is again stored in the register 15. The arithmetic operations are sequentially executed on the data stored in the register 15, so that the preceding result of the operation is applied as the next input of the operation in the order of instructions arranged on the program.

The controller with such arrangement generally operates as in the flow chart of FIG. 3. At step 30, the controller starts operation, and at step 31 initialization is made on the input processing circuits 11 and 12, output processing circuits 22 and 23 and registers 13, 15 to 19, and 21. Then, at step 32, input processing is made by the input processing circuit 11. That is, in the input processing circuit 11, the analog inputs from various transducers and digital inputs from switches are processed and fed to the input signal register 13. At step 33, the input processing circuit 12 acts to process the input signals from the control knobs or switches on the parameter setting portion 4 and front panel 5 in FIG. 1, and the variable parameters are stored in the register 17 via the circuit 20, the other input signals being stored in the register 19. Subsequently, at step 34, the program stored in the program memory 3 is interpreted and executed, and the results are stored in the output signal register 21 and the display register 19. The interim data during execution of the program is stored in the display register 18. At step 35, the contents of the registers 17, 18, and 19 are processed by the output processing circuit 23 and indicated by the displays 41, 42 and 53 and indicators 53 and 55. At step 36, the contents of the output signal register 21 are processed by the output processing circuit 22 and supplied as analog outputs for controlling various operating devices and digital outputs for controlling various switches. This program is started at each constant time, and when the program is finished fast, decision is made at step 37 of whether a predetermined time has elapsed or not. If the result is NO, a waiting operation is performed. When the predetermined time has elapsed, or the result of the decision is YES, the program goes back to step 32, and the same operations as above are repeated.

If an arbitrary parameter is displayed on the indicators 41 and 42, operation of certain keys of the key switch 43 will cause, at step 33, the input processing circuit 12 to supply a specific parameter of the control parameter, display parameter and operation parameter to the register 19. Then, at step 35, the output processing circuit 23 acts to read the specified parameter from the register 19 when the specific parameter is an operation parameter, from the register 17 when it is a variable parameter, or from the register 18 when it is a display parameter, and supply the specific parameter with parameter NO to the displays 41 and 42. When the data value of the displayed parameter is changed, the key of the key switch 43 for increasing or decreasing data is operated. Then, at step 33, the input processing circuit, after confirming that the SET/LOCK change-over switch of the switch 44 in the SET position, decides whether the display parameter is a variable parameter or a control parameter, and increases or decreases the contents of the display parameter, or the contents of the register 17 or 19.

When the output control knob 51 is operated, the input processing circuit 12, at step 33, after confirming that the AUTO/MANUAL switch knob 52 is in the MANUAL position, acts to supply to the control function special register 19 the value to which the control knob 51 is set, and at step 34 supplies it to the MV register of the output signal register 21. When the setting dial 56 is operated, the input processing circuit 12, at step 33, after confirming that the REMOTE/LOCAL change-over switch is in the LOCAL position, acts to increase or decrease the contents of a certain register of the control function special register 19.

The operation contents of step 34 in FIG. 3 are shown in FIG. 4. In FIG. 4, at step 41, execution of the program interpretation is started. The arithmetic processor 14, at step 342, reads a necessary program from the program memory 3, and then decides whether the read program needs a parameter as variables or not at step 343. If the results at step 343 is YES, the corresponding parameter is read from the register 13, 16, 17 or 19 at step 344, and it becomes a variable Z. If the result at step 343 is NO, the program jumps to step 345. At step 345, the value of the arithmetic register 15 is made a variable X. Then, at step 346, the computation of $Y=f(X, Z)$ is performed in accordance with the program in the program memory 3. The result of computation is stored in the arithmetic register 15 at step 347. At step 348, a decision is made of whether the program is completed or not. If the result at step 348 is NO, the computer goes back to the step 342 and reads the next program from the program memory 3, and then the same operations as above are performed. If the result at step 348 is YES, the program interpreting step 34 is finished.

In this way, arithmetic operations are performed by various operating elements on the basis of data applied to the registers 13, 15 to 19 and 21. At this time, operations of addition, subtraction, multiplication, division, and square root, PID control operation and so on are performed by the operation library incorporated in the memory of the processor 14.

The selection and combination of various operating elements, input and output, and the order of operations are determined on the basis of data in each register and the operations are performed by the arithmetic processor 14 in accordance with the operating programs stored in the program memory 3. The programs are made by the programmer 2 as described above.

The programmer 2 will hereinafter be described in detail. FIG. 5 is a detailed diagram of the panel portion of the programmer 2 shown in FIG. 1.

This programmer 2 has a function of producing a controller program for forming the control loop for a desired function by combining various control operating elements incorporated in the controller body and of storing the completed program in the program memory 3. As shown in FIG. 5, the key switches on the key board are arranged with common instrumentation terms as in the arithmetic library of the controller. Thus, the program can be produced by easy operation comparable to the desk-top electronic calculator so that the field operator in the process control can realize the controller having a control loop of a desired function without having a skilled software knowledge at all.

The key characters on the key board and the corresponding instrument terms are listed on the following table.

| Names of arithmetic elements | Key characters | Names of arithmetic elements | Key characters |
|---|---|---|---|
| Addition | + | First order lag | LAG |
| Subtraction | − | Differentiation | LEAD |
| Multiplication | × | Dead time | DDT |
| Division | ÷ | Change rate | RATE |

-continued

| Names of arithmetic elements | Key characters | Names of arithmetic elements | Key characters |
|---|---|---|---|
| | | calculation | |
| Absolute value | ABS | High limit alarm | HALM |
| Square root | ROOT | Low limit alarm | LALM |
| Segment function | FG | Comparison | COMP |
| Temperature compensation | TCF | Switching | SW |
| Pressure compensation | PCF | AND | AND |
| High selector | HSEL | OR | OR |
| Low selector | LSEL | NOT | NOT |
| Limiter | LMT | Control arithmetic | CTL |
| Change rate limiter | RLMT | | |

In FIG. 5 and on the table, [(−)], [0]-[9], and [.] represent push-button switches for numerical values and sign, [CLR] a push-button switch for clearing the previously made program, [RTN] a push-button switch for end of setting one computing element, and [END] a push-button for end of setting all the computing elements.

[AI], [AO], [M], [SV], [HA], [HD], [PA], [PD] and PT are push-buttons for specifying the registers 13, 15–19, and 21 for storing values used as variables upon operation. [AI] specifies the analog input register, [AO] the analog output register, and [HA] and [HD] analog and digital values of the interim signal register 16, respectively. [PA], [PD] and [PT] specify analog, digital and time values of the variable parameter register 17, respectively. If, for example, the second analog input to the input signal register 13 is specified, press the push-buttons [AI] and [2]. [+], [−], [×] and [÷] are push-buttons for computing elements and 2nd is a so-called shift key. If this button 2nd is pressed and then 8 is pressed, the LEAD displayed on the upper row is stored as a computing element. [RCL] is a push-button for storing the contents of the register 13, 16, 17, or 18 in the arithmetic register 15, [STO] a push-button for storing the contents of the arithmetic register 15 in the register 16, 18 or 21. [DEL], [INS] and [STP] push buttons for modifying the program: [DEL] for deleting, [INS] for insertion and [STP] for returning to the previous program step.

Figure 6:
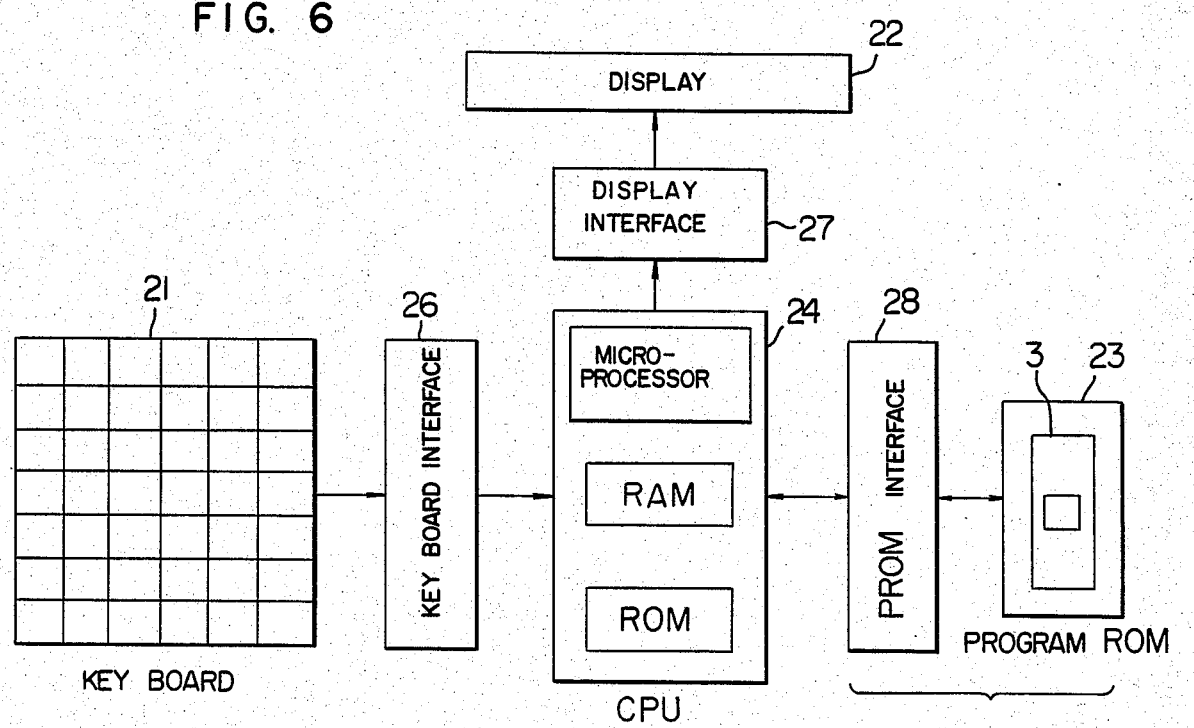
FIG. 6 is a block diagram of the circuit arrangement of the programmer.

The circuit arrangement of the programmer 2 will next be described with reference to FIG. 6. Shown at 21 is a key board of 42 key switches for the program, 24 a CPU using a microprocessor for producing a program after interpreting the contents of a key switch, and converting it into an arithmetic function code, 22 a display for displaying the contents of a program, and 25 a ROM driver for causing the produced program to be written in the program memory 3. The elements 21, 22, and 23 are coupled via interfaces 26, 27 and 28 to the CPU 24, respectively. The CPU 24, not only produces a program, but also receives switch information from the key board 21, causes the program to be written in or read from the memory 3, and controls input to and output from the display 22. The CPU 24 has an 8-bit microprocessor, a RAM and a ROM in the form of IC and LSI as does the one-loop controller. In the ROM is stored coded computing elements showing functions corresponding to the keys on the key board.

Figure 8:
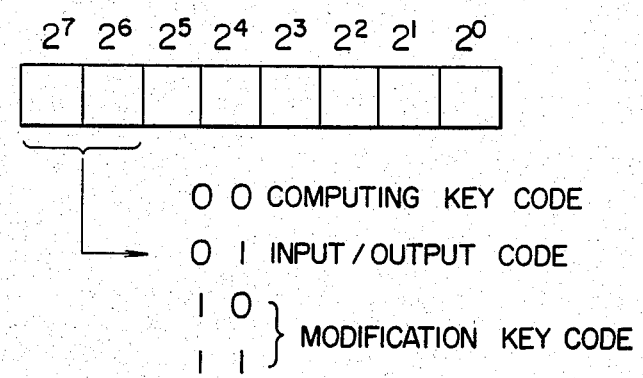
FIG. 8 shows the format of a key code from a key in the programmer.
Figures 7, 10:
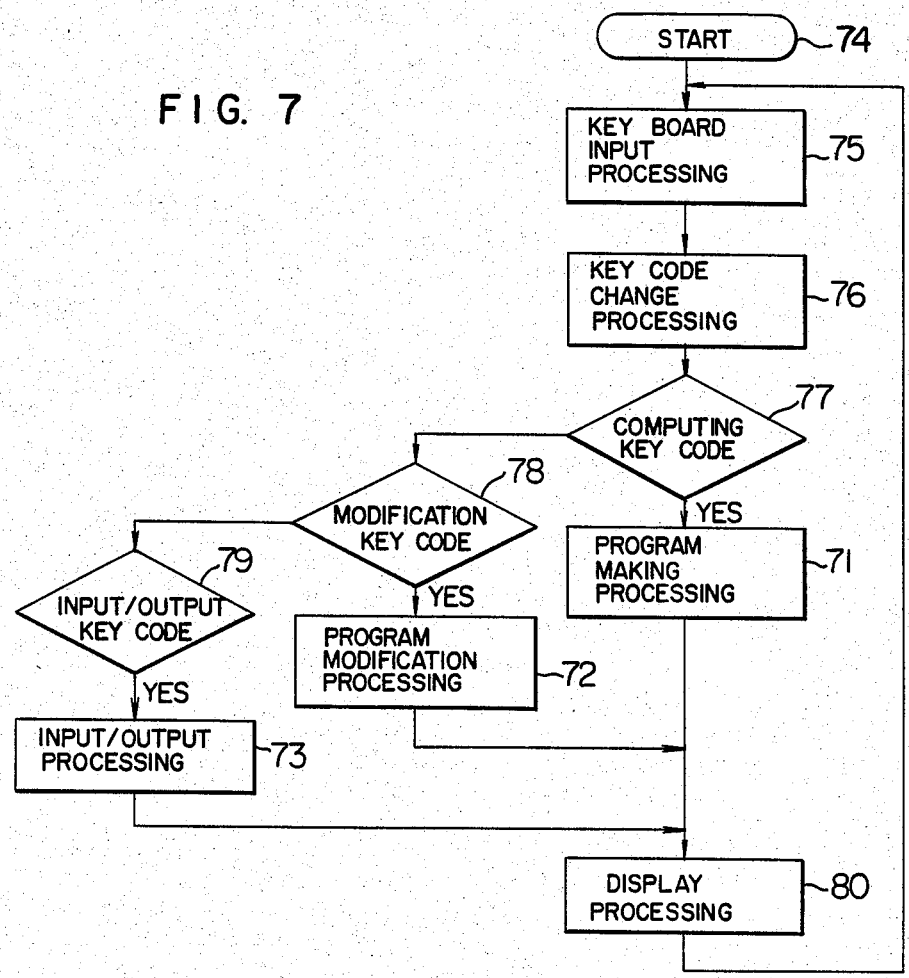
FIG. 7 is a flow chart for the operation of the programmer by depressing keys.
FIG. 10 shows the procedure of key operation for producing a program for the computation as shown in FIG. 9.

FIG. 7 is a flow chart of the programming in the programmer 2. This program has three functions including a program making processing 71, a program modifying processing 72, and an input/output processing 73, thereby forming three independent processing blocks. After the program starts at step 74, when key switches on the key board 21 are pressed, key board input processing is performed at step 75 and at step 76, on the basis of data inputted by the key board, the key code shown in FIG. 8 is read from the ROM of the CPU 24 into the RAM. At steps 77, 78 and 79, whether the operation key, modification key or input/output key is depressed is decided by the upper two bits of the key code. If the upper two bits are "00", the pressed key switch is the operation key, if they are "10", it is input-/output key, and if they are "11", it is modification key.

When the key code indicates the operation key, the program goes to the program making block 71 for converting to the arithmetic function code, where the operation key is interpreted for program making. If the key code indicates the modification key, the program goes to the modification block 72, where the keyed program is modified. If the key code is input/output key, the program goes to the block 73, where the produced program is written in and read from the memory 3. At step 80, the produced program is displayed on the display 22. The lower 6 bits in FIG. 8 represents the contents of the key switch as shown in FIG. 5.

When setting of computing elements is made by the key board of the programmer 2 the, $\boxed{\text{CLR}}$ button is first pressed to initialize the programmer 2 through the program making block 71 and then a push-button of a desired computing element is selected; for example, $\boxed{\text{2nd}}$ and ROOT for square root are pressed. Then, at block 71, ROOT is produced and at block 80, ROOT is displayed on the display window. Subsequently, a numerical-value key is pressed. In the example of FIG. 2, when the cut point is 0.01, or when the lower digits smaller than 0.01 are to be zero, $\boxed{\text{2nd}}$ ROOT $\boxed{0}$ $\boxed{.}$ $\boxed{0}$ $\boxed{1}$ are pressed. The pressed buttons are displayed on the display window 22. Then, $\boxed{\text{RTN}}$ is pressed to read in the programmer 2.

In this way, buttons are pressed in order to set computing elements. Upon completion of setting,

button is pressed so that at input/output block 73, the program is written in the program memory 3.

Thus, the program for the controller is produced by the programmer as follows.

First, a program for forming a control loop of a desired function is produced by the programmer 2. Then, the program memory 3 is mounted on the socket 23 of the programmer 2 and the program is written in the program memory 3. Finally, the program memory 3 in which the program is stored is dismounted from the socket 23 and mounted in the controller body 1.

An example of the control loop will be given below, and the actual key operation for the program making will be described with reference to FIGS. 4 to 6.

With reference to FIGS. 9 and 10, the operations of the programmer 2 for the PID operation control will be described in order. First, at program step 01, press $\boxed{\text{RCL}}$ key switch to clear all the contents of the program memory 3, and then press key switches $\boxed{\text{AI}}$ $\boxed{1}$ to produce a program for storing the first analog input signal in the arithmetic register 15. Subsequently, press the key switch $\boxed{\text{RTN}}$ to end setting of one computing element. Thus, an analog input signal PV is specified. Then, at program step 02, press key switches $\boxed{\text{CTL}}$ $\boxed{1}$ $\boxed{\text{SV}}$ $\boxed{\text{RTN}}$ in turn to operate the first control arithmetic operation as the set value stored in the register 19. At step 03, press the key switches in the illustrated order to store the contents of the arithmetic register 15 in the first storage portion of the output signal register 21. Finally, press the key switch $\boxed{\text{END}}$ to complete setting all the computing elements.

The arithmetic program for the PID arithmetic operation control with temperature compensation is produced as described below with reference to FIGS. 11 and 12. First, at step 01, press the key switches in the illustrated order to produce a program for storing the first analog input (amount of flow) in the input signal register 13 into the arithmetic register 15. Then, at step 02, press the key switches in the illustrated order to produce a program for performing temperature compensation arithmetic (TCF) for the second analog input (temperature) at the set values in the first and second storage portions of the variable parameter register 17 (PA). At step 03, press the keys to produce a program for performing pressure compensation arithmetic operation (PCF) for the third analog input at the set values in the third and fourth storage portions of the register 17 (PA). At step 04 there is produced the square root (at cut point, 0.1) arithmetic operation program for the pressure compensation arithmetic result. At step 05 there is produced the program of the first control arithmetic operation (CTL 1) using the storage portion SV of the register 19. At the following steps 06 and 07, the same procedure as in FIGS. 9 and 10 is taken for producing the program.

Figures 13, 14:
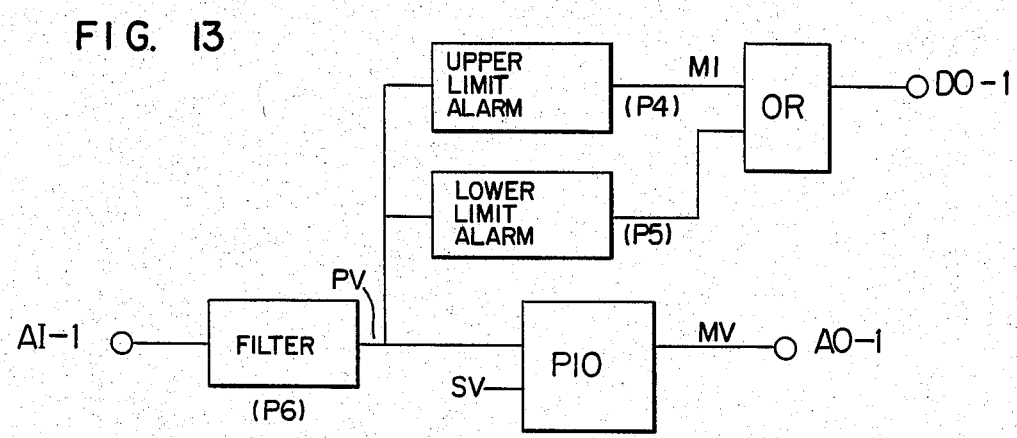
FIG. 13 is an arrangement for PID computation with upper and lower limit alarm ability.
FIG. 14 shows a procedure of key operation for producing a program for the computation as shown in FIG. 13.

The PID arithmetic control with upper-and lower-limit alarm will be described with reference to FIGS. 13 and 14. The program step 01 is the same as described above. At program step 02, press the keys in the illustrated order in FIG. 14 to produce the computing program for filtering, or primary delaying of the data stored in the arithmetic register 15. The arithmetic operation result is again stored in the arithmetic register 15. The time constant parameter of the arithmetic operation is stored in the storage portion (PT6) of the register 17. At program step 03, the result of the primary delay arithmetic operation is stored in the storage portion PV of the register 19. Thus, the execution of this arithmetic operation will not change the contents of the arithmetic register 15. At program step 04 is produced the program of the upper limit alarm arithmetic operation (HALM) for the contents of the register 15, using the value in the fourth storage portion of the register 17. The result is stored in the register 15. At program step 05, the contents of the register 15 are stored in the first storage portion of the interim register 16. At step 06 is produced a program for storing the value in the storage portion PV of the register 17 into the register 15. At step 07 is produced a program for performing the upper limit alarm arithmetic operation for the value of the register 15 using the value in the fifth storage portion of the register 17. At step 08 is produced a program for taking the logic sum of the values of the register 15 and 16 and storing the result in the register 15. At step 09 in produced a program for storing the value of the register 15 in the first storage portion of the register 21. At step 10 is produced a program for storing the contents of the register 17 in the register 15. At step 11 is produced a program for performing the first control arithmetic operation using the value of the register 15 as a measured value and the parameter SV as a set value and storing the result in the register 15. At the following steps 12 and 13 the same operations as described above are performed.

Thus, according to the invention, the field operator is able to realize a controller having a control loop of a desired function by simply utilizing the instrumentation terms without the detailed software knowledge.

I claim:

1. A controller for process control comprising:
   a programmer including memory means for encoding and storing a plurality of computing elements which may be combined to form programs necessary for determination of functions of the controller, key board means having plural keys for reading those computing elements stored in said memory means required for a selected program in response to depression of selected keys labeled with instrumentation terms identifying the program function, and means for producing a computing program for a desired function from said read out computing elements in response to depression of said keys of the key board;
   program memory means removably connected to said programmer for storing the computing programs produced by said programmer, said program memory means comprising a physically unpluggable programmable memory; and
   an arithmetic processing portion having register means for storing input signals, arithmetic means selectively connectable to said programmable memory for interpreting the codes of the computing programs stored in said program memory means and for executing an interpreted program on the basis of the data stored in said register means, and output means for outputting data obtained as a result of executing the computing program by said arithmetic means, said arithmetic processing portion being at no time electrically connected to said programmer.

2. A controller according to claim 1, wherein said programmer includes a body which is separated from a body carrying said arithmetic processing portion.

3. A controller according to claim 2, wherein the program memory means may be removably mounted on the body of the programmer or on the body carrying said arithmetic processing portion.

4. A controller according to claim 1, wherein the arithmetic processing portion further includes arithmetic register means for storing interim data during execution of a computing program, means for performing arithmetic operations on the basis of data stored in the arithmetic register means, and means for storing the result of the operations in said arithmetic register means.

5. A programmer for use in selectively providing programs for controlling the operation of a controller without electrical connection to said controller, wherein said controller includes an arithmetic processing portion having register means for storing input signals received from external devices, arithmetic means for decoding and executing various programs on the basis of the data stored in said register means, output means for outputting data obtained as a result of the operation of said arithmetic means and program memory means for storing the programs decoded and executed by said arithmetic means, said program memory means being provided in the form of a physically unpluggable programmable memory, said programmer comprising:
   key board means having plural keys for selectively generating signals representing desired instrumentation functions upon depression of selected keys;
   processor means responsive to signals from said key board means for producing the programs for said desired instrumentation functions, including memory means for encoding and storing a plurality of computing elements necessary for said programs and means responsive to a signal from said key board upon depression of a selected key for reading out of said memory means one or more computing elements required for a desired instrumentation function; and
   circuit means for removably connecting said physically unpluggable programmable memory of said controller to said processor means to effect a storing therein of programs for said desired instrumentation functions to be performed by said controller.

6. A programmer according to claim 5, further including a housing for said key board means, said processor means and said circuit means, and wherein said controller has its own housing separate from the housing of said programmer.

7. A programmer according to claim 5, wherein said arithmetic means of said controller includes means for storing interim data during execution of a computing program, means for performing arithmetic operations on the basis of data stored in said register means and said stored interim data, and means for storing the result of said arithmetic operations.

* * * * *